United States Patent
Kaneko et al.

(10) Patent No.: US 7,571,740 B2
(45) Date of Patent: Aug. 11, 2009

(54) FUEL CUTOFF VALVE

(75) Inventors: Kenichiro Kaneko, Aichi-ken (JP); Hiroaki Kito, Aichi-ken (JP); Hiroshi Nishi, Aichi-ken (JP); Shoji Uhara, Wako (JP); Hideo Watanabe, Wako (JP); Yasuhiro Hasegawa, Wako (JP)

(73) Assignees: Toyoda Gosei Co., Ltd., Aichi-pref. (JP); Honda Motor Co., Ltd., Tokyo (JP)

( * ) Notice: Subject to any disclaimer, the term of this patent is extended or adjusted under 35 U.S.C. 154(b) by 230 days.

(21) Appl. No.: 11/492,227

(22) Filed: Jul. 25, 2006

(65) Prior Publication Data
US 2007/0084510 A1 Apr. 19, 2007

(30) Foreign Application Priority Data
Jul. 29, 2005 (JP) ............... 2005-220457

(51) Int. Cl.
*F16K 24/04* (2006.01)
*F16K 31/18* (2006.01)
*B60K 15/035* (2006.01)

(52) U.S. Cl. .......................... 137/202; 137/430; 137/43
(58) Field of Classification Search .................. 137/43, 137/202, 409, 429, 430, 493.2
See application file for complete search history.

(56) References Cited

U.S. PATENT DOCUMENTS

| | | | | |
|---|---|---|---|---|
| 5,566,705 A | * | 10/1996 | Harris | 137/43 |
| 5,638,856 A | * | 6/1997 | Ohsaki | 137/202 |
| 5,666,989 A | * | 9/1997 | Roetker | 137/43 |
| 6,508,263 B1 | * | 1/2003 | Jahnke et al. | 137/202 |
| 6,564,821 B1 | * | 5/2003 | Orenstein et al. | 137/202 |
| 7,146,729 B2 | * | 12/2006 | Spink et al. | 29/890.124 |
| 2003/0111111 A1 | * | 6/2003 | Zorine | 137/202 |
| 2004/0261846 A1 | | 12/2004 | Matsuo et al. | |

FOREIGN PATENT DOCUMENTS

| | | |
|---|---|---|
| JP | U-05-001547 | 1/1993 |
| JP | A-10-213260 | 8/1998 |
| JP | A-2004-308838 | 11/2004 |

* cited by examiner

*Primary Examiner*—Stephen M Hepperle
*Assistant Examiner*—Atif H Chaudry
(74) *Attorney, Agent, or Firm*—Posz Law Group, PLC

(57) ABSTRACT

A fuel cutoff valve is provided with a casing that forms a valve chamber that is connected to a connection conduit, a float mechanism that is housed so as to be able to rise and fall in the valve chamber, and a spring that supports the float mechanism. The float mechanism is structured through an assembly of a first float body and a second float body, where the first float body is provided with a valve portion that opens and closes the connection conduit and provided with a storage chamber that is open on the bottom, where the second float body is housed in the storage chamber to be assembled into the first float body.

2 Claims, 16 Drawing Sheets

FTa(FT)
FTb

FUEL CUTOFF VALVE

This application claims the benefit of and priority from Japanese Application No. 2005-220457 filed Jul. 29, 2005, the content of which is incorporated herein by reference.

BACKGROUND OF THE INVENTION

1. Field of the Invention

The present invention relates to a fuel cutoff valve mounted on an upper wall of a fuel tank to open and close a connection conduit, which connects the inside of the fuel tank with the outside.

2. Description of the Related Art

Conventional fuel cutoff valves have been known in JP-A-2004-308838, and JU-A-5-1547. The fuel cutoff valve is mounted on the upper wall of a fuel tank, and comprises a casing with a connection conduit that connects to the outside (the canister) and a float that rises and falls with changes in the buoyant force according to the fuel level within a valve chamber of the casing. The fuel cutoff valve closes the connection conduit by the float rising due to an increase in buoyant force due to an increase in the fuel level within the fuel tank, preventing the fuel from flowing to the outside.

The conventional fuel cutoff valve float is formed with a thin-wall cup shape providing a buoyancy chamber, open towards the bottom, which prevents the occurrence of shrinkage that tend to occur at the time of the injection molding of the float, making it possible to increase the precision of the molding. In this type of cup-shaped float, the buoyancy chamber is sealed off when the fuel level rises above the bottom edge of the float. The vapor in the sealed buoyancy chamber expands and contracts depending on changes in the temperature within the fuel tank, causing variability in the buoyancy of the float. Because of this, the fuel cutoff valve has a problem in that the cutoff fuel level will vary depending on changes in temperature within the fuel tank. When the buoyancy chamber is reduced in size in order to solve this problem, then not only does the molding precision of the float suffer due to shrinkage in the resin at the time of injection molding, but there is an additional problem in that this also causes a reduction in productivity due to the increased time required for cooling.

SUMMARY

An advantage of some aspects of the invention is to provide a fuel cut off valve that reduces variability in the cutoff fuel level due to variation in temperature within the fuel tank and improves the molding precision of the float while providing superior manufacturability.

The present invention is provided with a cut off valve that opens and closes a connection conduit for connecting a tank to a location exterior to the tank. The cut off valve comprising a casing that includes a valve chamber that is constructed and arranged to connect the fuel tank to the connection conduit, a float mechanism that is accommodated in the valve chamber to open and close the connection conduit according to a level of a liquid fuel in the fuel tank and a spring that presses the float mechanism in a closing direction. The float mechanism includes a first float body that has a valve portion opening and closing the connection conduit and a storage chamber opened downwardly, and a second float body that is received in the storage chamber to be joined with the first float body. The second float body includes a bottomless spring chamber that includes a spring support for supporting the spring, the spring being configured to be received in the storage chamber and supported on the spring support.

In a fuel tank that uses a fuel cutoff valve according to the present invention, when fuel is provided into said fuel tank so that the fuel reaches a predetermined level in the fuel tank, the float mechanism is raised by a buoyant force, caused by the fuel that has flowed into the valve chamber, so that the valve portion closes the connection conduit, cutting off the fuel tank from the outside, thereby preventing fuel from flowing from the fuel tank to the outside.

The float mechanism is a mechanism with a plurality of members, comprising a first float body and a second float body, or in other words, the wall thickness of the first float body can be made thinner by using a structure wherein the second float body fills the storage chamber of the cup-shaped first float body. Doing so makes it possible to reduce the shrinkage in the valve portion, or the like, of the first float body, making it possible to increase the mold efficiency, when fabricating the first float body using injection molding. Moreover, by having the first float body be cup-shaped, the storage chamber of the first float body, which opens in the downwards direction, is filled by the second float body, making it possible to reduce the volume of vapor that enters therein, making it possible to reduce the variation in the cutoff fuel level by eliminating the variations in the buoyant force of the float mechanism accompanying changes in the temperature of the vapor.

Furthermore, because the storage chamber in the first float body is large, cooling means can be provided in the mold for fabricating the storage chamber when the float mechanism is fabricated through resin injection molding, and the second float body may be a member small enough to fill the storage chamber, so cooling of both members will not require extended time intervals. Consequently, it is possible to reduce the length of the fabrication cycle in injection molding, with superior manufacturability.

Since the first float body and the second float body can be structured so as to be integrated by a fitting means comprising an engaging claw and a fitting hole, this structure makes it possible to reduce the amount of work in assembling the first float body and the second float body.

Moreover, the second float body comprises a spring chamber that opens in the downwards direction and that has a spring support for supporting said spring, wherein said spring is not only stored in said spring chamber, but can also be supported by said spring support.

Since the top part of said storage chamber may be structured so as to connect to the outside of said float mechanism through a vent that is formed through said first float body, this makes it possible to reduce variations in the valve closing position through reducing variations in the buoyant force of the float mechanism accompanying changes in temperature of the vapor, because the storage chamber is not vapor-tight.

Moreover, the spring may be structured so as to provide a spring support wherein one end of the spring is supported on either the first float body or the second float body.

In yet another preferred form, structuring so as to provide a spring storage space, for storing said spring, between the inside wall of said storage chamber and the outer peripheral part of said second float body enables the float mechanism to be structured compactly. In this structure, said spring storage space may be structured so as to be connected to the outside of said float mechanism through a vent that is formed through said first float body. As a preferred form of the present invention, said first float body may be provided with an essentially cylindrical first float main body, and said valve portion may be structured from an upper valve unit disposed at the top part of said first float main body.

These and other objects, features, aspects, and advantages of the present invention will become more apparent from the following detailed description of the preferred embodiments with the accompanying drawings.

DESCRIPTION OF THE PREFERRED EMBODIMENTS

A. First Embodiment (1) Schematic Structure of Fuel Cutoff Valve 10

Figure 1:
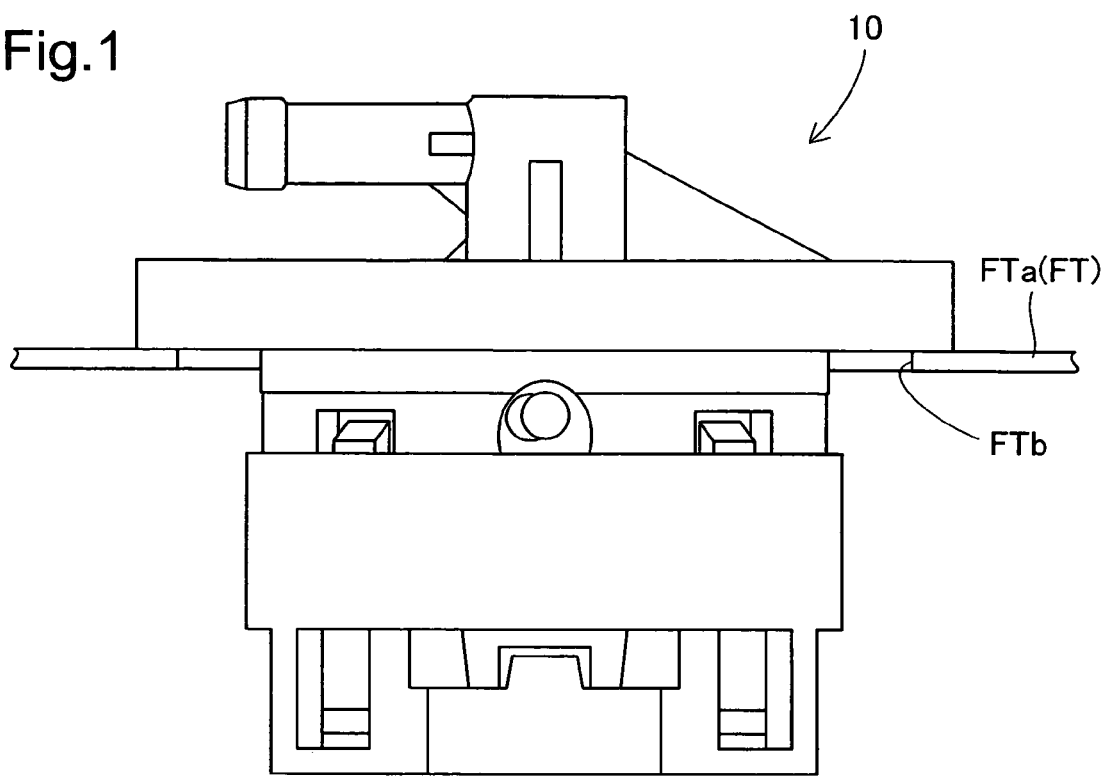
FIG. 1 is a side view showing a fuel cutoff valve attached at the top part of an automobile fuel tank, according to a first embodiment of the present invention.
Figure 2:
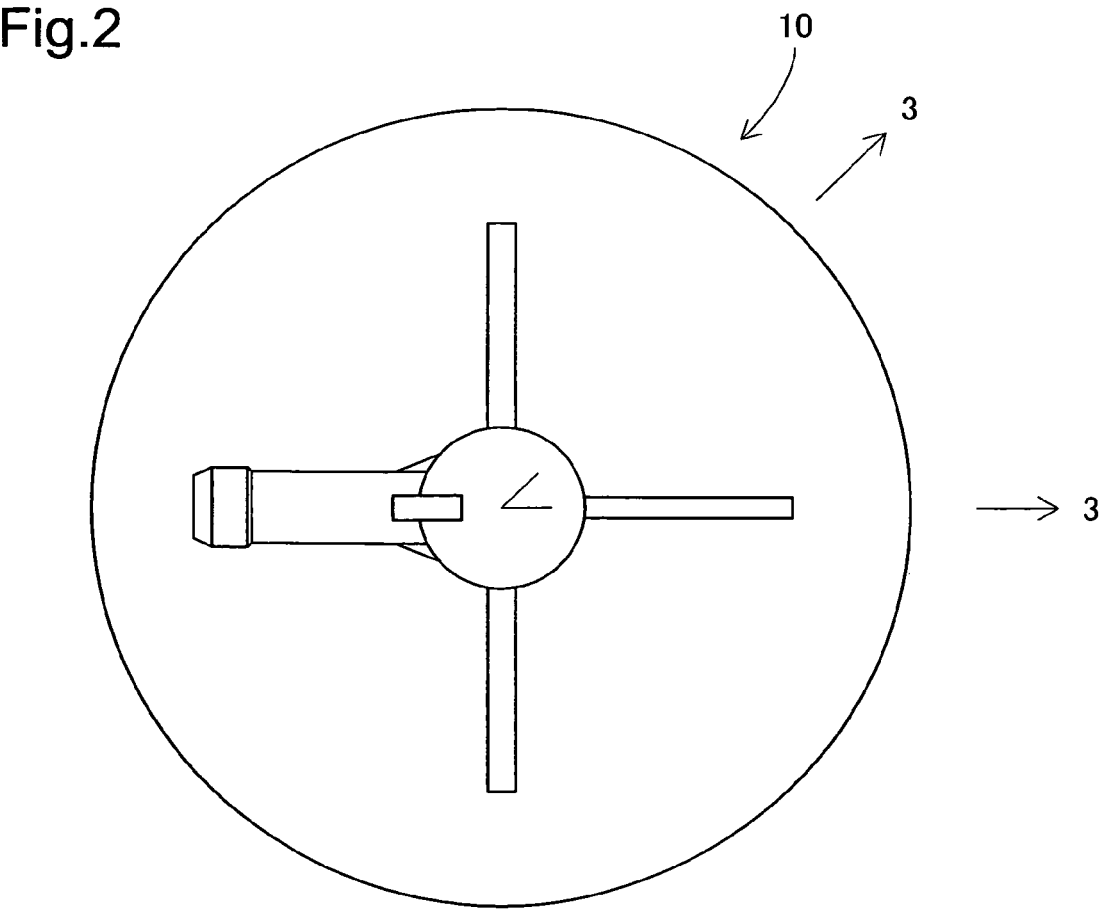
FIG. 2 is a plan view of the fuel cutoff valve.
Figure 3:
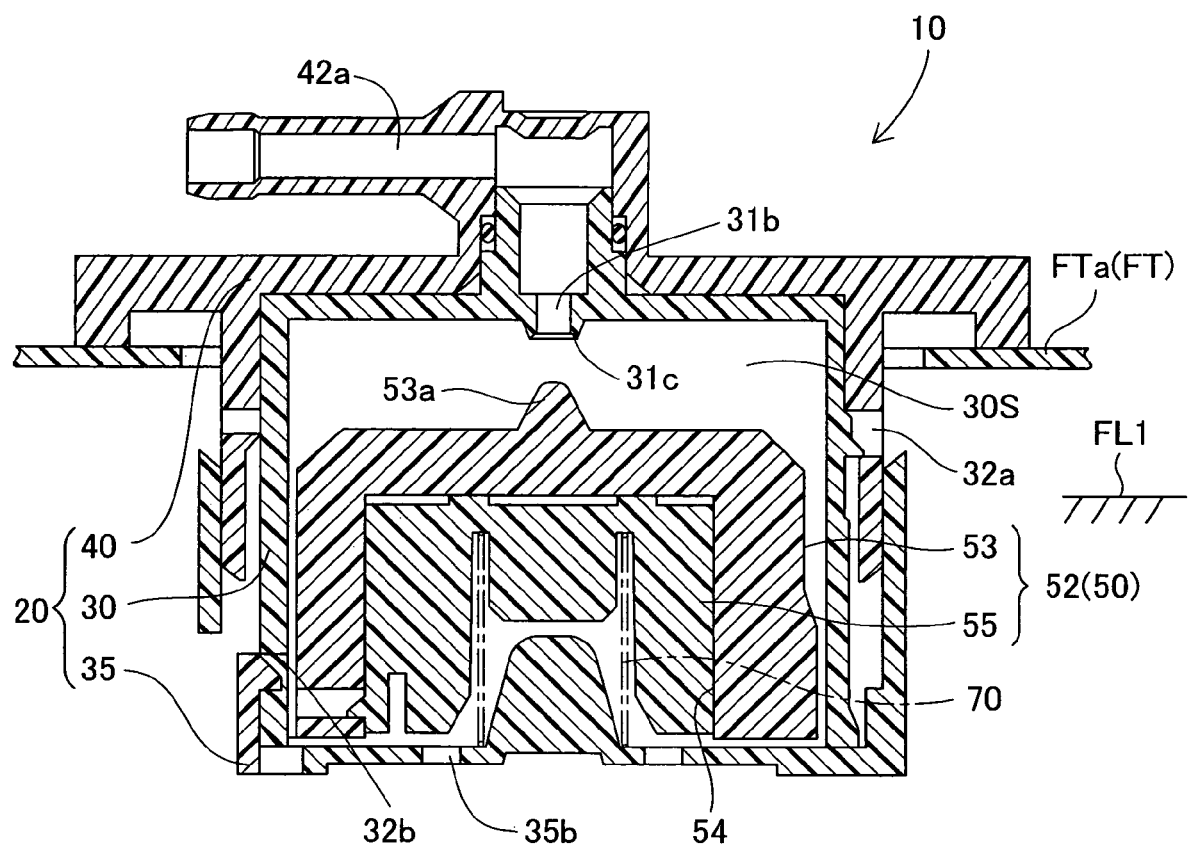
FIG. 3 is a cross-sectional view along the section 3-3 in FIG. 2.

FIG. 1 is a side view illustrating a fuel cutoff valve 10, attached at the top part of an automobile fuel tank FT, according to an embodiment of the present invention; FIG. 2 is a plan view of the fuel cutoff valve 10; and FIG. 3 is a cross-sectional view along the section 3-3 in FIG. 2. In FIG. 1, the fuel tank FT is fabricated from a compound resin material that includes polyethylene on the surface thereof, structured with an attachment hole FTb at the tank upper wall FTa. The fuel cutoff valve 10 is attached to the tank upper wall FTa in a state wherein the lower part of the fuel cutoff valve 10 is inserted into the attachment hole FTb. The fuel cutoff valve 10 prevents the flow of fuel from the fuel tank FT into the canister when the vehicle is at an angle in the pitch or roll direction.

(2) Structure of Each Part of the Fuel Cutoff Valve 10

In FIG. 3, the fuel cutoff valve 10 is provided with a casing 20, a float mechanism 50, and a spring 70 as the critical components thereof. The casing 20 comprises a casing main body 30, a bottom plate 35, and a cover 40, where the space surrounded by the casing main body 30 and the bottom plate 35 provides a valve chamber 30S, where the float mechanism 50, supported on a spring 70, is housed in the valve chamber 30S.

Figure 4:
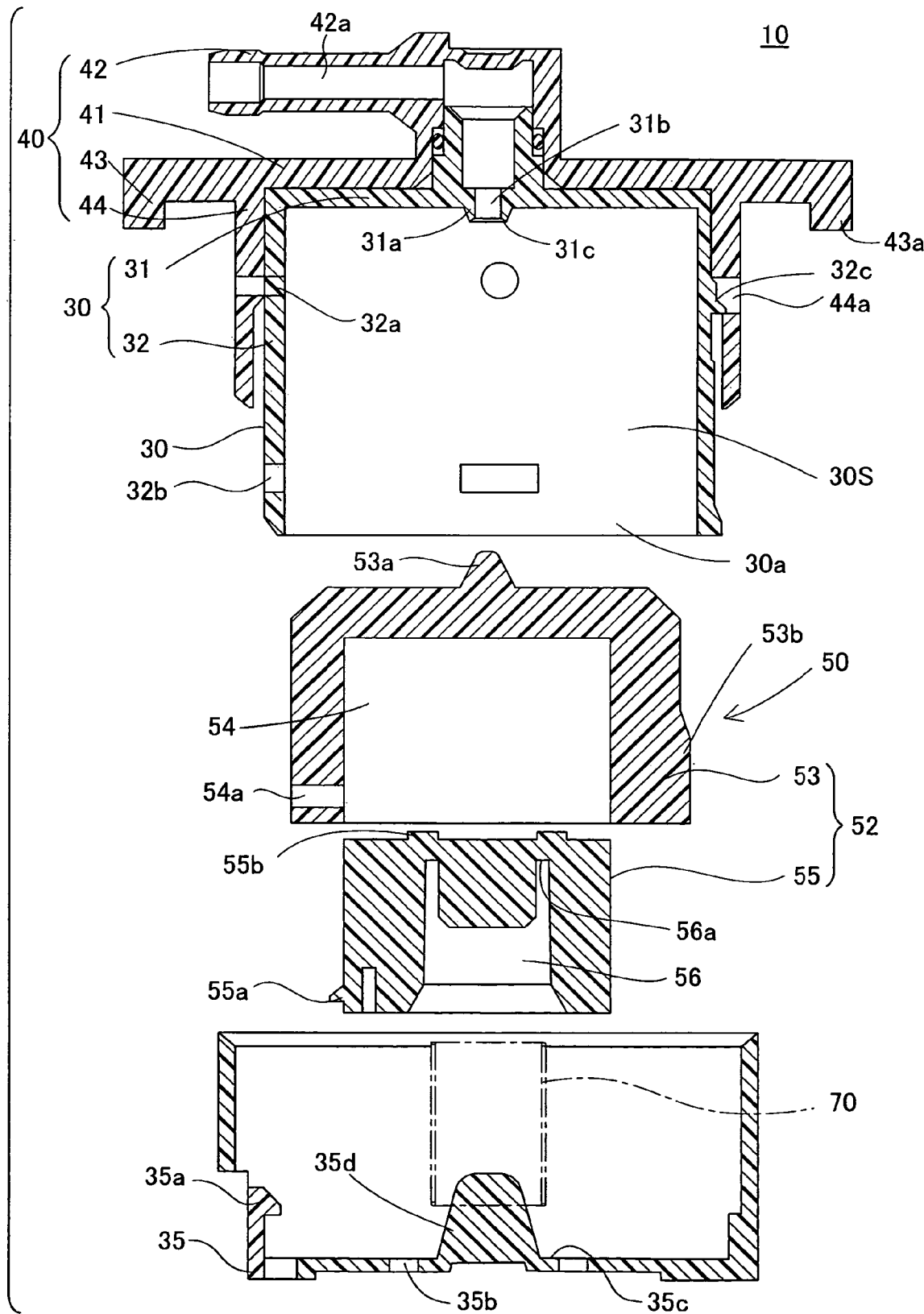
FIG. 4 is a cross-sectional view of the assembly of the fuel cutoff valve.

FIG. 4 is a cross-sectional view of the assembly of the fuel cutoff valve 10. The casing main body 30 has a cup shape, surrounded by a top wall 31 and a side wall 32, where the bottom is an opening 30a. In the center of the top wall 31 is formed a passage formation projection 31a that is established projecting downward, where a connection conduit 31b connecting to the valve chamber 30S, is formed passing through the passage formation projection 31a. A connection hole 32a, connecting the inside of the fuel tank FT and the valve chamber 30S is formed in the side wall 32, and a fitting hole 32b, both for attaching the bottom plate 35 and for allowing the fuel to flow, into and out of the valve chamber 30S, is also formed in the side wall 32. The bottom plate 35 is a member that closes the opening 30a of the casing main body 30, and the engaging claw 35a, formed about the periphery of the bottom plate 35, mates with the fitting hole 32b of the casing main body 30 to attach so as to close the opening 30a of the casing main body 30. A connection hole 35b and a spring support 35c, for supporting the bottom of the spring 70, are formed on the top surface of the bottom plate 35.

The cover 40 is provided with a cover main body 41, a tubular member 42 protruding to the side from the center of the cover main body 41, a flange 43 formed around the periphery of the cover main body 41, and a support part 44, which are all structured integratedly. The tubular member 42 is formed with a cover passage 42a, where one end of the cover passage 42a is connected through the connection conduit 31b to the valve chamber 30S of the casing main body 30, and connected at the other end to the canister side (not shown). The support part 44 is formed under the cover main body 41, and is a cylindrical member that mates with and supports the upper part of the casing main body 30. A fitting hole 44a is formed in the support part 44. The fitting hole 44a mates with the engaging claw 32c formed on the side wall 32 of the casing main body 30 so that the cover 40 holds the casing main body 30. Additionally, an outside welding element 43a, welded to the tank top wall FTa of the fuel tank FT, is formed at the bottom edge of the flange 43.

Figure 5:
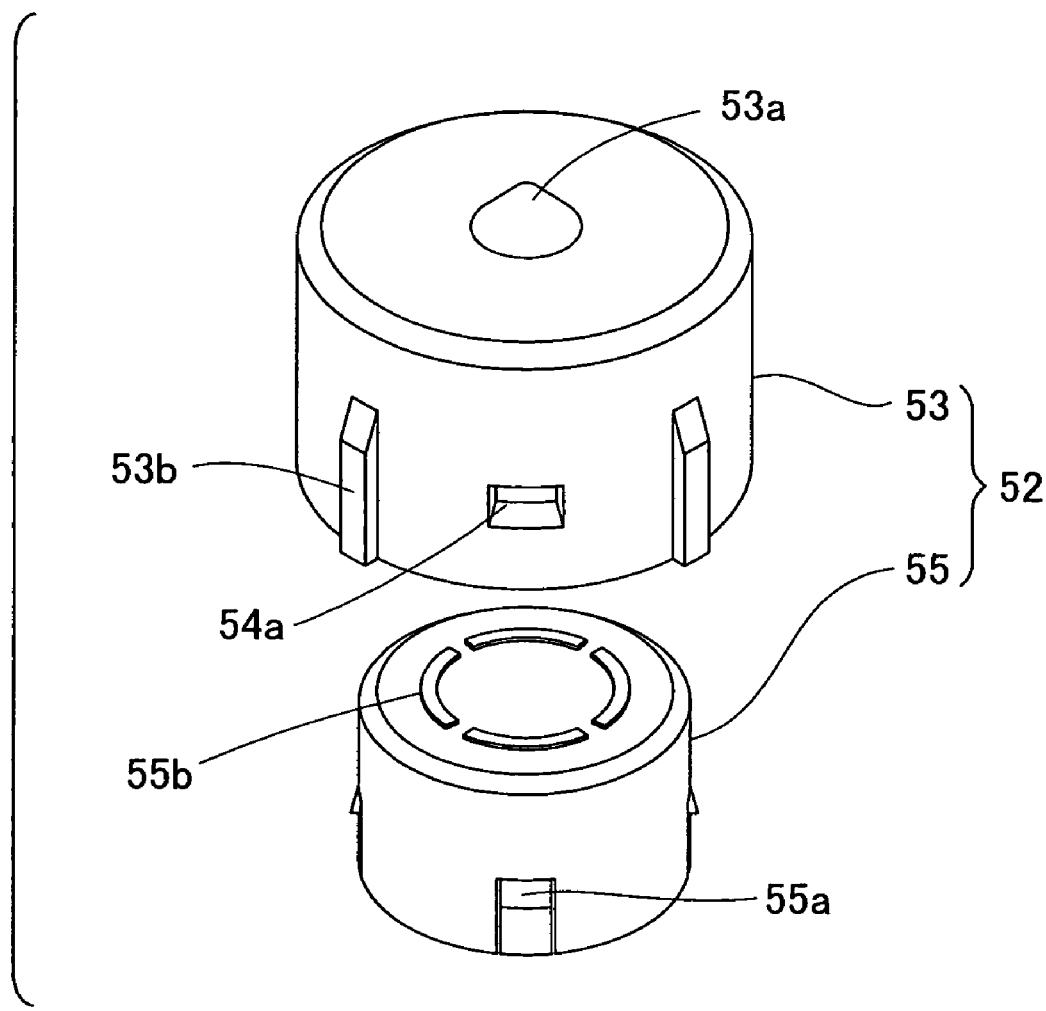
FIG. 5 is a perspective view of the assembly of the float mechanism.

The float mechanism 50 is provided with a float 52. FIG. 5 is a perspective view of the assembly of the float 52. In FIG. 4 and FIG. 5, the float 52 is provided with a first float body 53 and a second float body 55, which are assembled into a single unit. The first float body 53 has a cup shape that has a storage chamber 54 that is open on the bottom. The storage chamber 54 has a bottom hole for storing the second float body 55. A fitting hole 54a is open through the bottom part of the storage chamber 54. Moreover, an essentially conical valve portion 53a is provided protruding at the top of the first float body 53. The valve portion 53a is structured so as to open and close the connection conduit 31b by pressing against or removing from a seal part 31c through the float 52 rising and falling. Moreover, in order to improve the sliding action relative to the inside wall of the casing main body 30, guide ribs 53b are established in the vertical direction in several locations on the outer periphery of the first float body 53.

The second float body 55 is essentially a circular column that is inserted into the storage chamber 54, and an engaging claw 55a is fabricated on the bottom thereof. The engaging claw 55a mates with the fitting hole 54a of the first float body 53 to integrate the second float body 55 with the first float body 53. Moreover, a spring chamber 56, open at the bottom, is formed in the second float body 55. The spring chamber 56 is provided with a spring support end 56a that receives the top end of a spring 70, and, in order to reduce the capacity thereof, a protruding portion 35d is inserted into the center top part of the bottom plate 35. Furthermore, a positioning step 55b is disposed in a ring shape on the top surface of the second float body 55. The positioning step 55b performs positioning so as to prevent play of the second float body 55 relative to the first float body 53 at the bottom surface of the storage chamber 54 of the first float body 53.

(3) Operation of the Fuel Cutoff Valve 10

The operation of the fuel cutoff valve 10 will be explained next. In FIG. 3, when the fuel level within the fuel tank FT rises during vehicle vibration or tilting, for example, the fuel vapors accumulated at the upper space of the fuel tank FT enter into the valve chamber 30S through the connection hole 35b and escape to the canister through the connection conduit 31b and the cover passage 42a. At this time, as the fuel level within the fuel tank FT rises, the fuel enters into the valve chamber 30S through the connection hole 35b. When the fuel level reaches a predetermined level FL1 the buoyant force of the float 52 and the force in the upwards direction due to the loading of the spring 70 counteracts the force in the downwards direction due to the weight of the float 52, and when the former surpasses the latter, the float 52 moves upwards. When the valve portion 53a of the float 52 seats against the seal part 31c, the connection conduit 31b is closed. This makes it possible to prevent the fuel from flowing to the outside of the fuel tank FT while allowing the fuel vapors to escape from the fuel tank FT during vehicle vibration or tilting. On the other hand, when the fuel level in the fuel tank FT falls and the fuel within the valve chamber 30S drains from the connection hole 35b, etc., the float 52 receives a force in the downwards direction as the buoyancy force is decreased, and the valve portion 53a separates from the seal part 31c to open the connection conduit 31b.

(4) Action and Effects of the Embodiment

The following action and effects are produced by the structure in the embodiment described above.

(4)-1 The float 52 being structured from a plurality of first float body 53 and second float body 55, or in other words, being structured from storage chamber 54 of the cup-shaped first float bodies 53 being filled with the second float body 55 makes it possible to reduce the wall thickness of the first float body 53. This makes it possible to reduce the shrinkage in, for example, the valve portion 53a and the guide ribs 53b of the first float body 53 when fabricating the first float body 53 through injection molding, making it possible to increase the molding precision. Moreover, having the first float body 53 have a cup shape makes it possible to reduce the size of the chamber that is sealed by the fuel by having the open-bottom storage chamber 54 of the float 52 be filled with the second float body 55, thus making it possible to reduce the variability in the valve closing fluid level through reducing the variability in the buoyant force of the float 52 due to variations in the temperature of the sealed vapor.

(4)-2 In assembling the second float body 55 to the first float body 53, the assembly operations are easy because when the second float body 55 is inserted into the storage chamber 54 of the first float body 53 then, the engaging claw 55a mates with the fitting hole 54a.

(4)-3 In fabricating the float 52 using resin injection molding, as the storage chamber 54 is made large for the first float body 53, then it will be possible to provide a cooling means in the mold for fabricating the storage chamber 54, and for the second float body 55, there is no need for lengthy cooling of both parts because all that is needed is for the part to be small enough to fit into the storage chamber 54. Consequently, it is possible to reduce the length of the fabrication cycle in injection molding, producing excellent productivity.

B. Second Embodiment (1) Schematic Structure of Fuel Cutoff Valve 100

Figure 6:
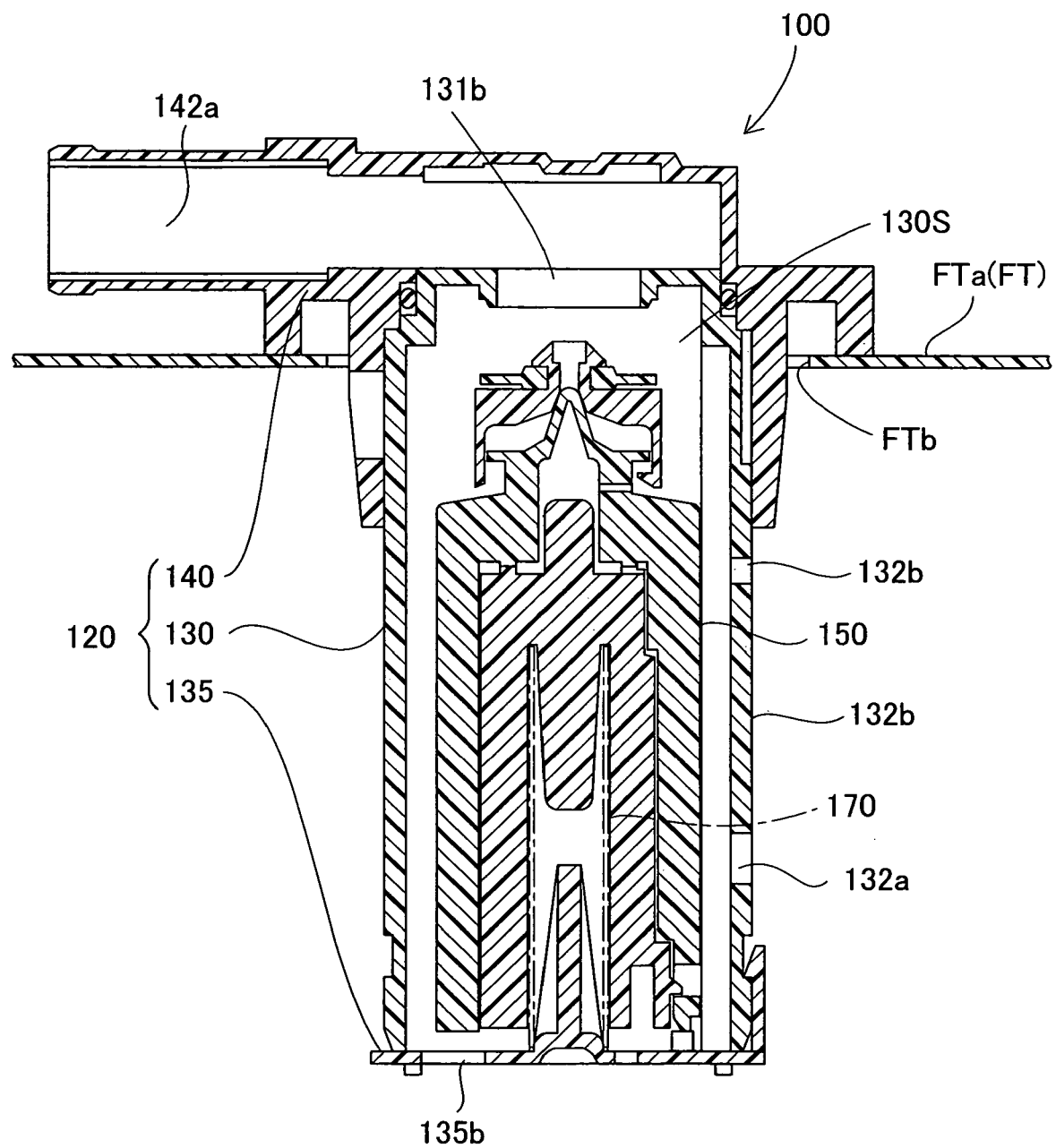
FIG. 6 is a cross-sectional view of a fuel cutoff valve according to a second embodiment.

The fuel cutoff valve in the second embodiment has an auto-stop function along with preventing the flow of fuel within the fuel tank into the canister during fueling until a predetermined level has been reached, and also prevents overfill. FIG. 6 is a cross-sectional view of a fuel cutoff valve 100. The fuel cutoff valve 100 comprises a casing 120, a float mechanism 150, and a spring 170 as the primary structures thereof. The casing 120 is provided with a casing main body 130, a bottom plate 135, and a cover 140, where the space surrounded by the casing main body 130 and the bottom plate 135 forms a valve chamber 130S, where the float mechanism 150, supported by a spring 170, is housed in the valve chamber 130S.

(2) Structure of Each Part of the Fuel Cutoff Valve 100

Figure 7:
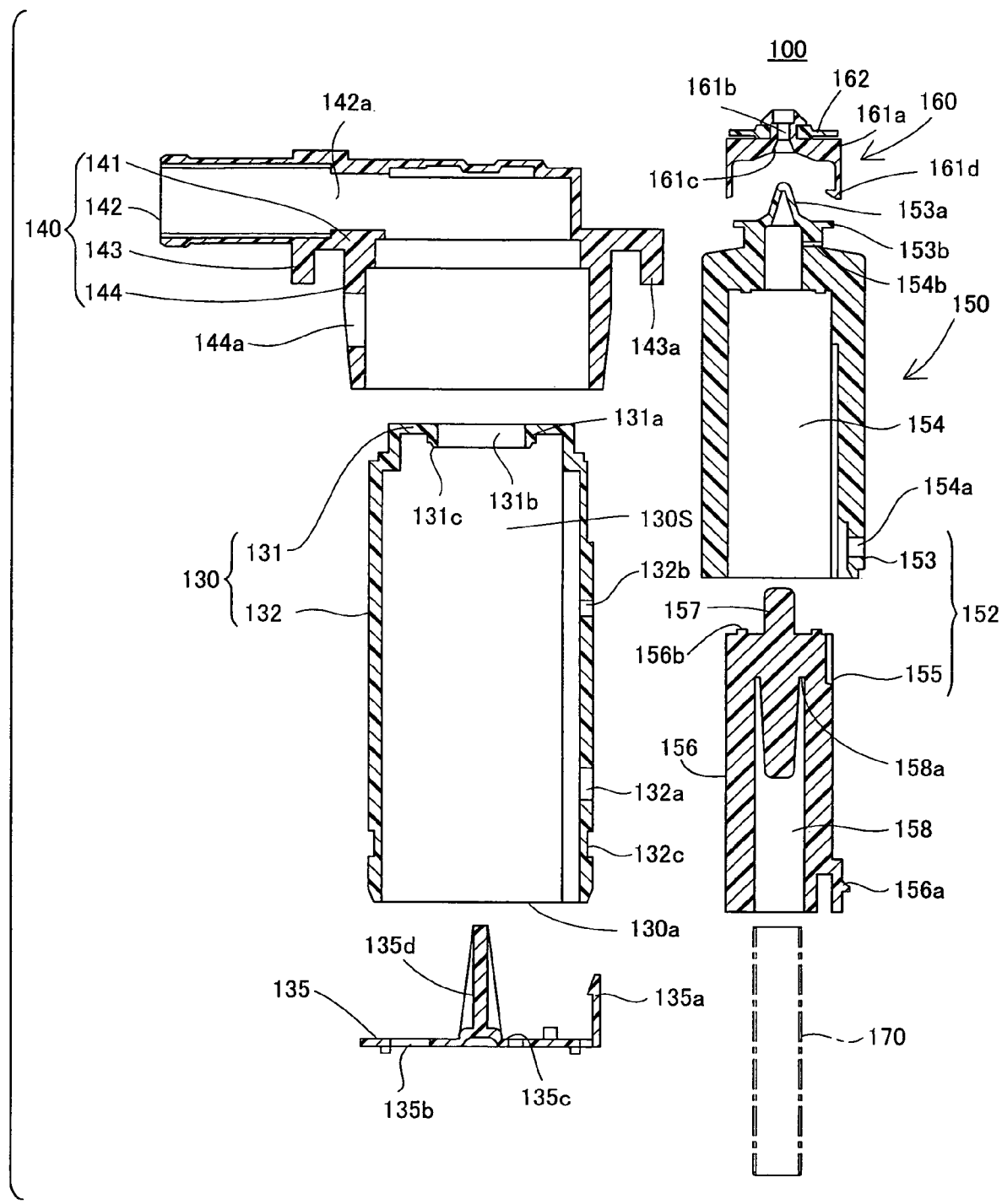
FIG. 7 is a cross-sectional view of the assembly of the fuel cutoff valve according to the second embodiment.

FIG. 7 is a cross-sectional view of the assembly of the fuel cutoff valve 100. The casing main body 130 is cup-shaped, surrounded by a top wall 131 and a side wall 132, where the bottom is an opening 130a. A passage formation projection 131a, protruding facing downward, is formed in the center part of the top wall 131, and a connection conduit 131b, connecting to the valve chamber 130S, is formed through the passage formation projection 131a. The valve chamber 130S side of the connection conduit 131b is a first seal part 131c. A first connection hole 132a and a second connection hole 132b, for connecting the valve chamber 130S to the inside of the fuel tank FT are formed in the side wall 132. The first connection hole 132a is disposed so that the top edge thereof is coincident with a predetermined level FL1 (See FIG. 9.). The second connection hole 132b is an opening that is disposed higher than the predetermined level FL1, disposed at 90° intervals in four locations around the periphery. Moreover engaging recesses 132c are provided in the side wall 132 for attaching the bottom plate 135. The bottom plate 135 is a member that closes the opening 130a of the casing main body 130, where the engaging claw 135a, formed around the outer peripheral part, mates with the engaging recess 132c in such a way as to close the opening 130a of the casing main body 130. The bottom plate 135 is provided with a third connection hole, and the spring support 135c for supporting the bottom edge of the spring 170.

The cover 140 is provided with a cover main body 141, a tubular member that protrudes towards the side from the center of the cover main body 141, a flange 143, and a support part 144, where these are formed integrally. A cover passage 142a is formed in the tubular member 142, and one end of the cover passage 142a passes through the connection conduit 131b to connect to the valve chamber 130S of the casing main body 130, where the other end connects to the canister side (not shown). A cover main body 141 is provided at the bottom part of the support part 144, where is a cylinder that mates with the top part of the casing main body 130. A fitting hole 144a is formed in the support part 144. The fitting hole 144a mates with an engaging claw (not shown) formed on the side wall 132 of the casing main body 130 so that the cover 140 holds the casing main body 130. Moreover, a welding element 143a is welded to the tank top wall FTa of the fuel tank FT at the bottom edge part of the flange 143.

Figure 8:
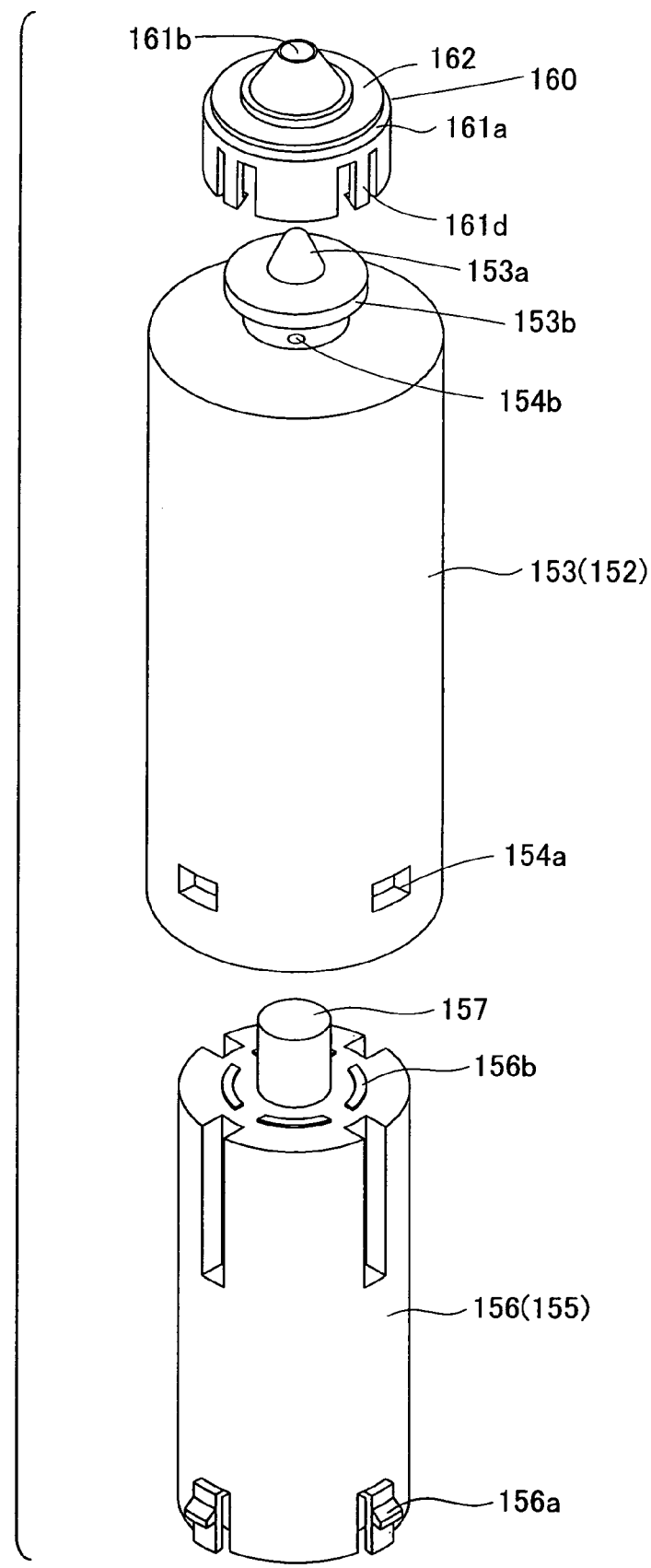
FIG. 8 is a perspective view of the assembly of a float mechanism.

FIG. 8 is a perspective view showing the assembly of the float mechanism 150. In FIG. 7 and FIG. 8, the float mechanism 150 is provided with a float 152 and an upper valve unit 160, disposed at the top of the float 152. The float 152 is provided with a first float body 153 and a second float body 155, which are assembled together into a single unit. The first float body 153 is cup-shaped, having a storage chamber 154 that is open at the bottom. The storage chamber 154 has a bottom hole for storing the second float body 155. A fitting hole 154a is formed through the bottom of the storage chamber 154, and a ventilator hole 154b is formed in the radial direction at the top of the storage chamber 154. Moreover, an essentially conical valve portion 153a is provided protruding at the top of the first float body 153, where a flange 153b for fastening the upper valve unit 160 is formed below the valve portion 153a.

A second float body 155 is provided with a large diameter portion 156, which is essentially cylindrical and inserted into the storage chamber 154, and also provided with a small diameter portion 157. An engaging claw 156a is formed at the bottom of the large diameter portion 156. The engaging claw 156a mates with the fitting hole 154a of the first float body 153 to fasten the second float body 155 to the first float body 153. A step portion 156b is formed at the top surface of the large diameter portion 156, where positioning is performed through pushing against the top surface of the storage chamber 154 to increase the molding accuracy. Moreover, a spring chamber 158, open at the bottom, is formed in the second float body 155. This spring chamber 158 is provided with a spring support end 158a for receiving the top end of the spring 170, and the protruding portion 135d of the top of the center of the bottom plate 135 is inserted in order to reduce the volume thereof.

The upper valve unit 160 is a valve for improving the reopening characteristics, and is supported on top of the float 152 so as to be able to rise and fall, where a connection hole 161b, that is opened and closed by the valve portion 153a, is formed in the center of a disk 161a. The bottom edge of the connection hole 161b is a second seal part 161c. An engaging claw 161d, for mating with the flange 153b of the float 152 is provided protruding at the bottom edge of the outer periphery of the disk 161a. A rubber seat member 162 is provided at the top of the upper valve unit 160, where the seat member 162 can press against or be separated from the first seal part 131c.

(3) Operation of the Fuel Cutoff Valve 100

Figure 9:
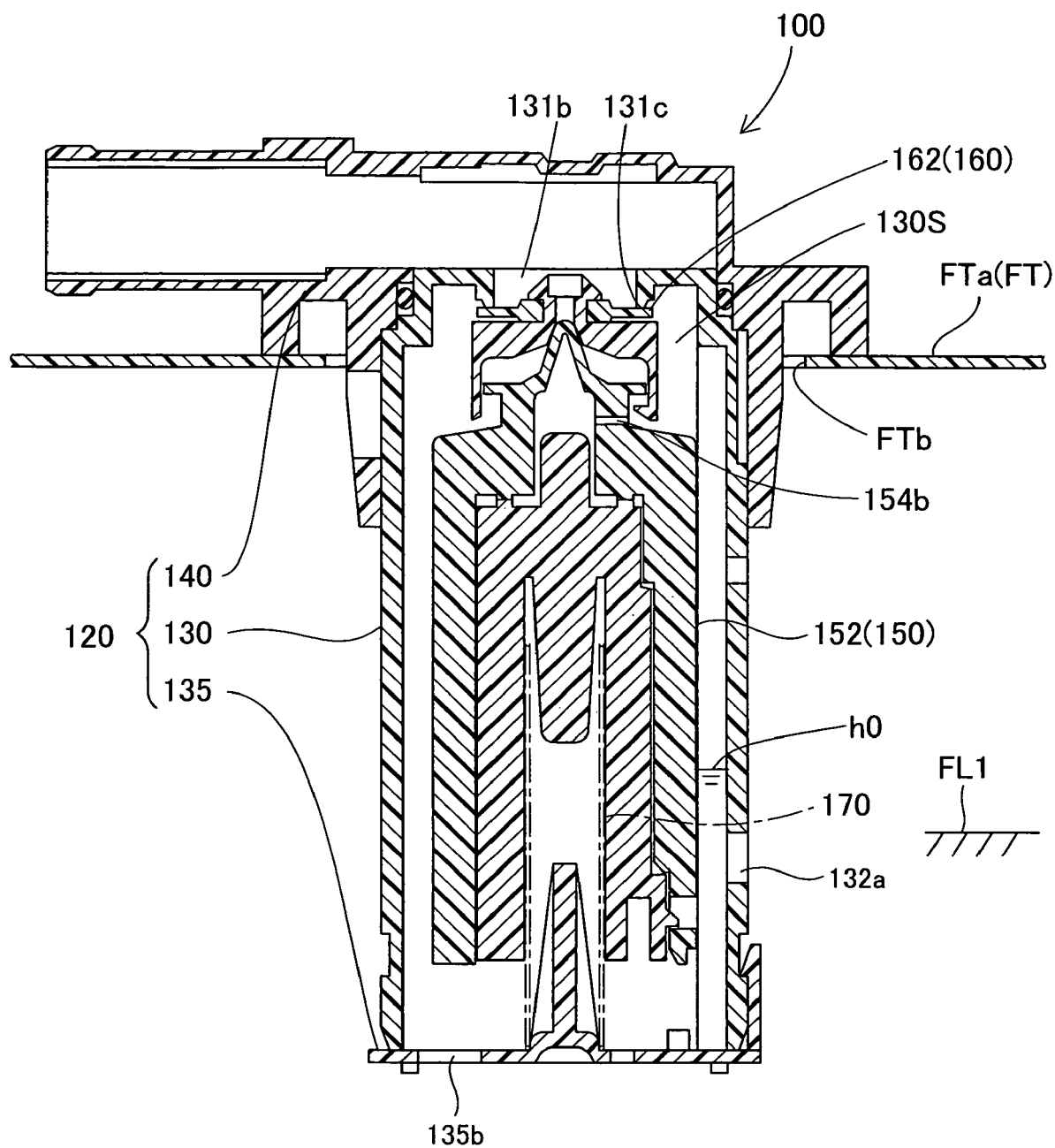
FIG. 9 shows the operation of the fuel cutoff valve.

The operation of the fuel cutoff valve 100 will be explained next. When fuel is being supplied into the fuel tank FT during fueling, as the fuel level within the fuel tank FT rises, as shown in FIG. 6, the fuel vapors that accumulate at the top of the fuel tank FT flow into the valve chamber 130S through the first connection hole 132a and the second connection hole 132b in the side wall 132, and escape to the canister side from the valve chamber 130S through the connection conduit 131b and the cover passage 142a. As shown in FIG. 9, when the fuel level FL within the fuel tank FT arrives at a predetermined level FL1, the fuel covers the first connection hole 132a, causing the pressure within the fuel tank FT to rise. This increase in tank pressure is sensed by a sensor to actuate the auto-stop that stops the supply of fuel from the fueling nozzle. In this state, the pressure differential between the tank pressure and the pressure within the valve chamber 130S increases, and the fuel level moves up within the valve chamber 130S. When the fuel level within the valve chamber 130S reaches a height h0, the force in the upward direction due to the buoyancy of the float 152 and the load on the spring 170 counteracts the force in the downward direction due to the weight of the float 152 and of the upper valve unit 160, and when the former surpasses the latter, the float 152 and the upper valve unit 160 move upward together, and the seat member 162 seats onto the first seal part 131c to close the connection conduit 131b. This makes it possible to prevent the fuel from flowing to the outside of the fuel tank FT, while allowing the fuel vapor to escape from the fuel tank FT when, for example, fuel is supplied into the fuel tank FT.

Figure 10:
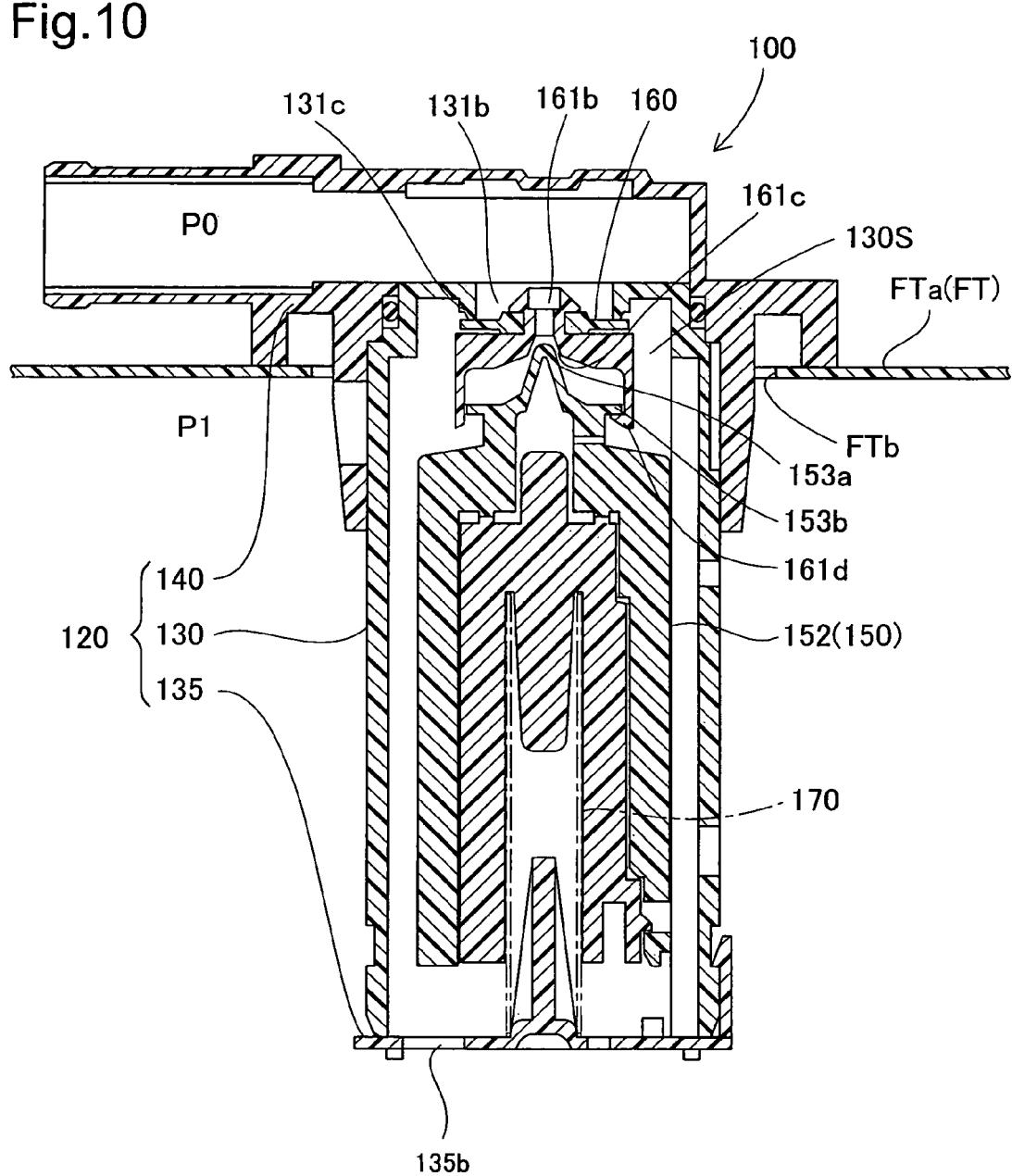
FIG. 10 shows the operation, continuing from FIG. 9.

On the other hand, when the fuel level within the fuel tank FT falls, the fuel within the valve chamber 130S drains from the third connection hole 1351b, etc., and, as shown in FIG. 10, the float 152 receives a force in the downwards direction because the buoyancy force is reduced, causing the valve portion 153a to separate from the second seal part 161c, to open the connection hole 161b. The pressure below the upper valve unit 160 goes to approximately the same pressure as in the vicinity of the connection conduit 131b via the connection hole 161b, so the pressure in the closing direction on the upper valve unit 160 is reduced, and by the flange 153b mating with the engaging claw 161d, the upper valve unit 160 is pulled downwards and the seat member 162 separates from the first seal part 131c, opening the connection conduit 131b.

The reason why this is able to improve the reopening characteristics in the fuel cutoff valve 100 will be explained next. In FIG. 10, when the area of the flow path of the connection hole 161b of the upper valve unit 160 is defined as S1, the tank-side pressure is defined as P1, the canister-side pressure is defined as P0, the spring load is defined as K, and the total weight of the float 152 and the upper valve unit 160 is defined as W, the upper valve unit 160 will open from a closed state when the values satisfy the following equation (1):

$$(P1-P0)S1 <= W-K \qquad (1)$$

The right-hand side of Equation (1) is the difference between the weight W and the spring load K, and this is assumed to be a constant positive value, or in other words, is assumed to exert a force on the upper valve unit 160 in the opening direction, where the left-hand side is the force that is applied on the upper valve unit 160 in the closing direction as suction on the first seal part 131c. When the area SI of the flow path is small, then the valve will open even if there is a large differential pressure (P1−P0). In other words, if the canister-side pressure P0 is assumed to be constant, then even if there is a large tank-side pressure P1, the valve will still open. Consequently, setting the area of the flow path of the connection conduit 131b to a value that is smaller than the area S1 of the flow path of the connection hole 161b makes it possible to open the upper valve unit 160 with a only small force. In this way, the two-step valve structure using the upper valve unit 160 functions to provide improved reopening characteristics.

(4) Action and Effects of the Present Embodiment

The structure in the embodiment described above describes the following action and effects.

(4)-1 The float 152 is able to achieve a reduction in the variability in the valve closing level and a reduction in the fabrication cycle through the structure of the first float body 153 and the second float body 155 in the same manner as in the first embodiment.

(4)-2 As shown in FIG. 2, the top part of the storage chamber 154 is connected to the outside of the float 152 through the ventilator hole 154b, and thus even if fuel were to get into the gap between the first float body 153 and the second float body 155, the fuel would quickly drain, and there would be no noticeable change in weight in the float 152.

Figure 11:
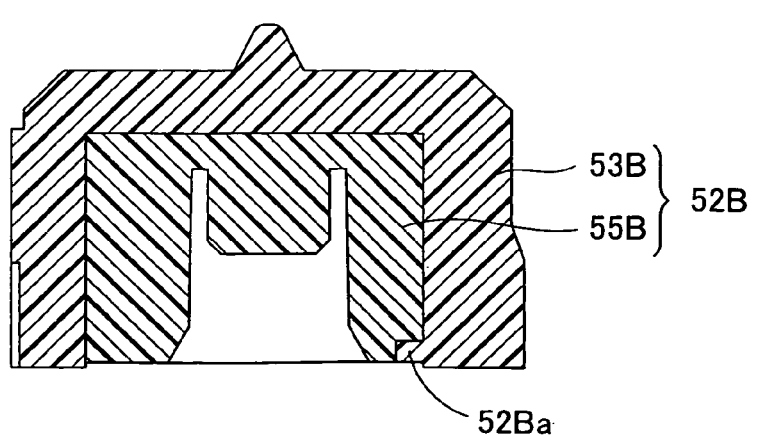
FIG. 11 is a cross-sectional view illustrating a float mechanism according to an alternate example of the first embodiment.

FIG. 11 is a cross-sectional view showing a float according to another embodiment. In this other embodiment, instead of the first float body and the second float body being fabricated as separate members and then assembled, as in the first embodiment, a float 52b is structured as an integrated unit using two-color molding. In other words, a first float body 53 is fabricated in advance through injection molding, and after the float body 53 is placed in the mold, a second float body 55 is fabricated using injection molding. In this structure, the protrusion 52ba is fabricated at the inner peripheral part of the bottom end of the first float body, which is desirable because the bonding with the second float body 55 is strong.

C. Third Embodiment (1) Structure of A Fuel Cutoff Valve 200

Figure 12:
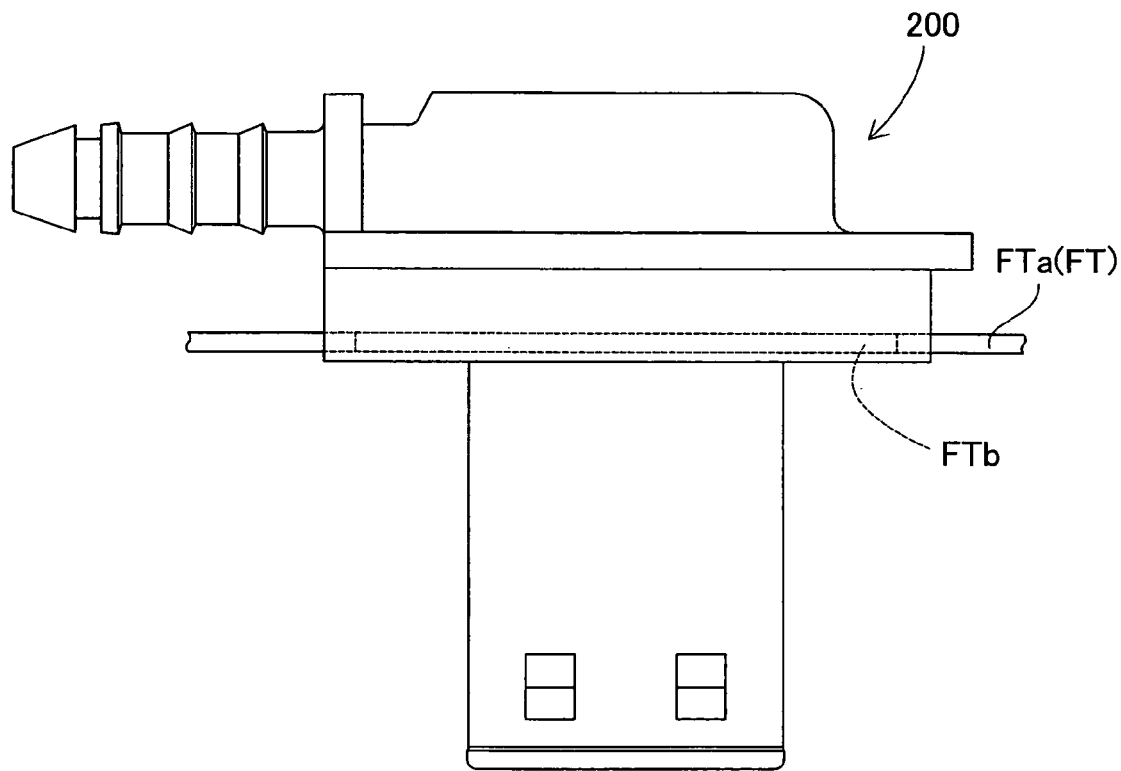
FIG. 12 is a cross-sectional view illustrating a fuel cutoff valve according to a third embodiment.
Figure 13:
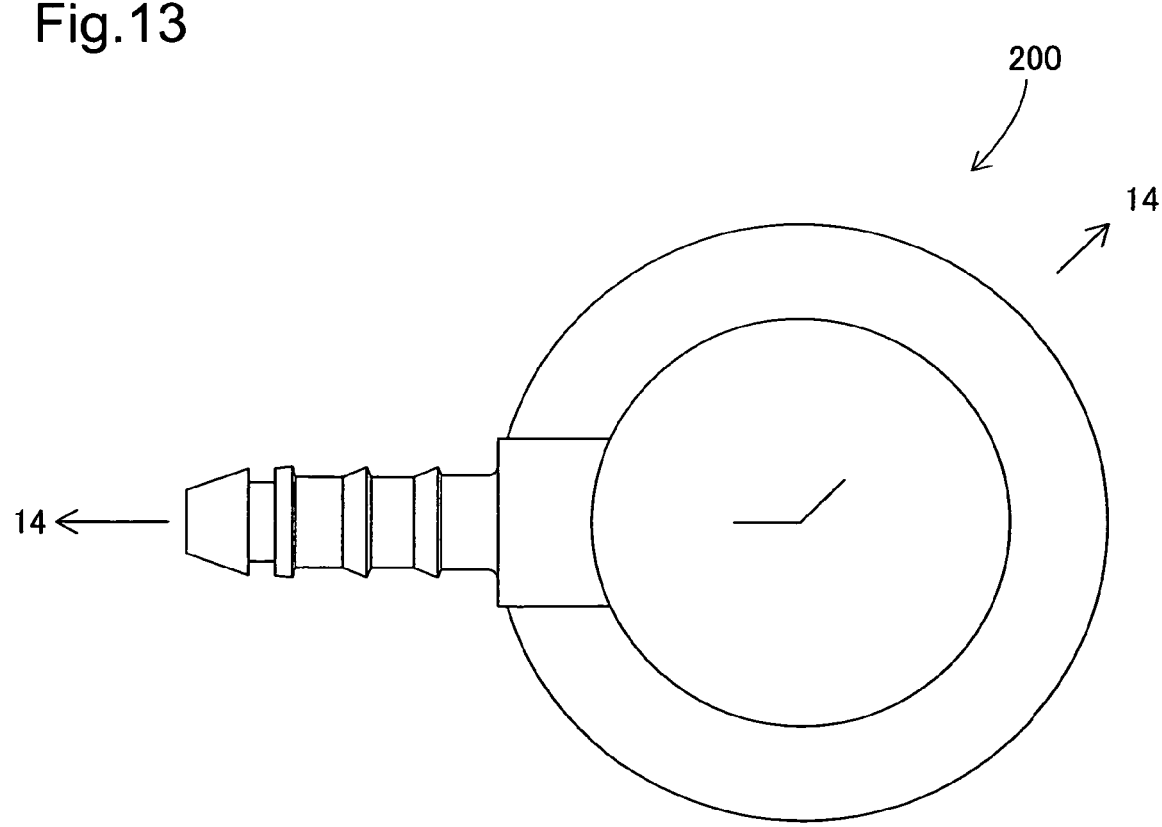
FIG. 13 is a plan view of the a fuel cutoff valve.
Figure 14:
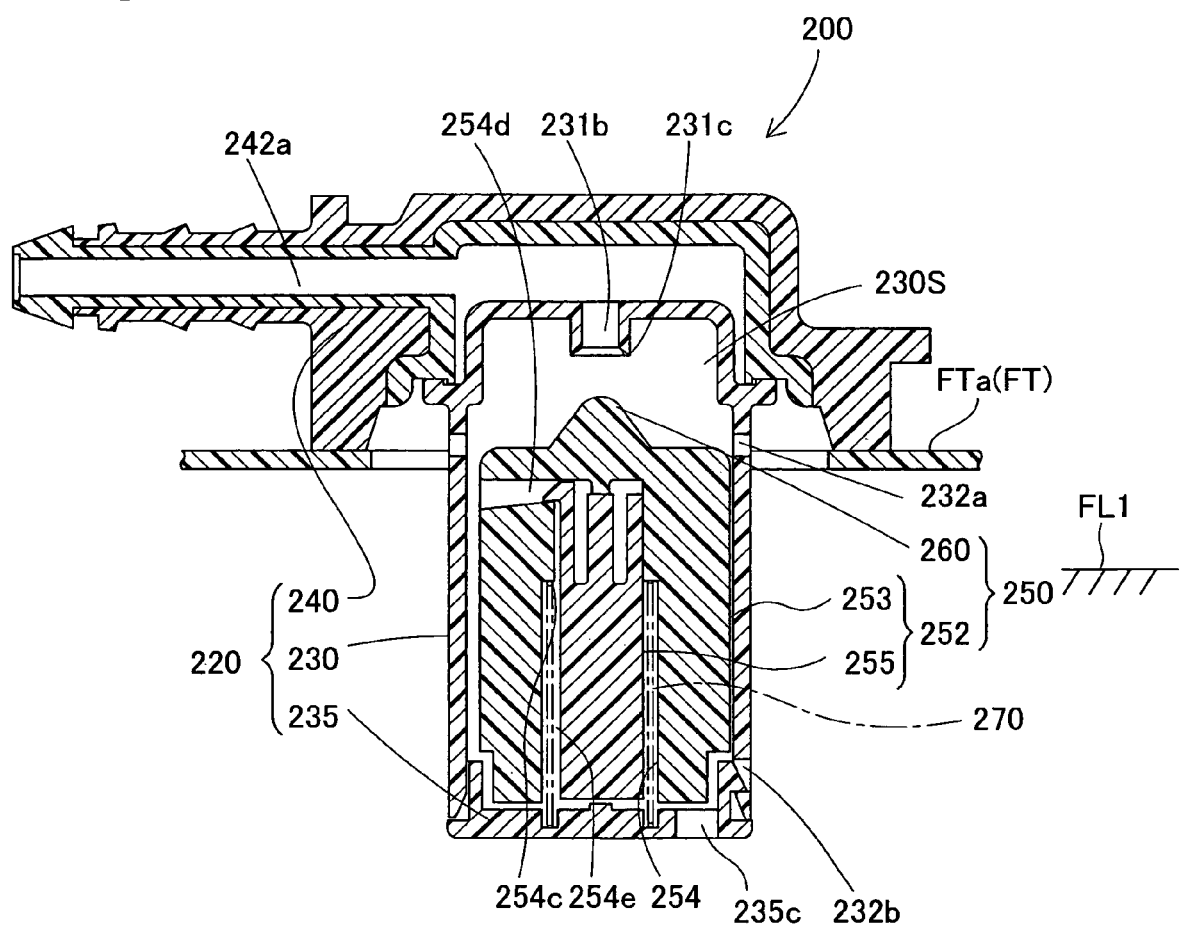
FIG. 14 is a cross-sectional view along the section 14-14 in FIG. 13.

FIG. 12 is a side view illustrating a fuel cutoff valve 200, equipped at the top part of a fuel tank FT of an automobile, according to a third embodiment according to the present invention, FIG. 13 is a plan view of the fuel cutoff valve 200, and FIG. 14 is a cross-sectional view along the section 14-14 in FIG. 13. The fuel cutoff valve 200 prevents the fuel inside of the fuel tank FT from flowing out to the canister when the automobile is at an angle in the pitch or roll direction.

In FIG. 14, the fuel cutoff valve 200 is provided with a casing 220, a float mechanism 250, and a spring 270 as the main structural components thereof. The casing 220 is provided with a casing main body 230, a bottom plate 235, and a cover 240, where the space surrounded by the casing main body 230 and the bottom plate 235 forms a valve chamber 230S, where a float mechanism 250, supported on a spring 270, is housed in the valve chamber 230S.

Figure 15:
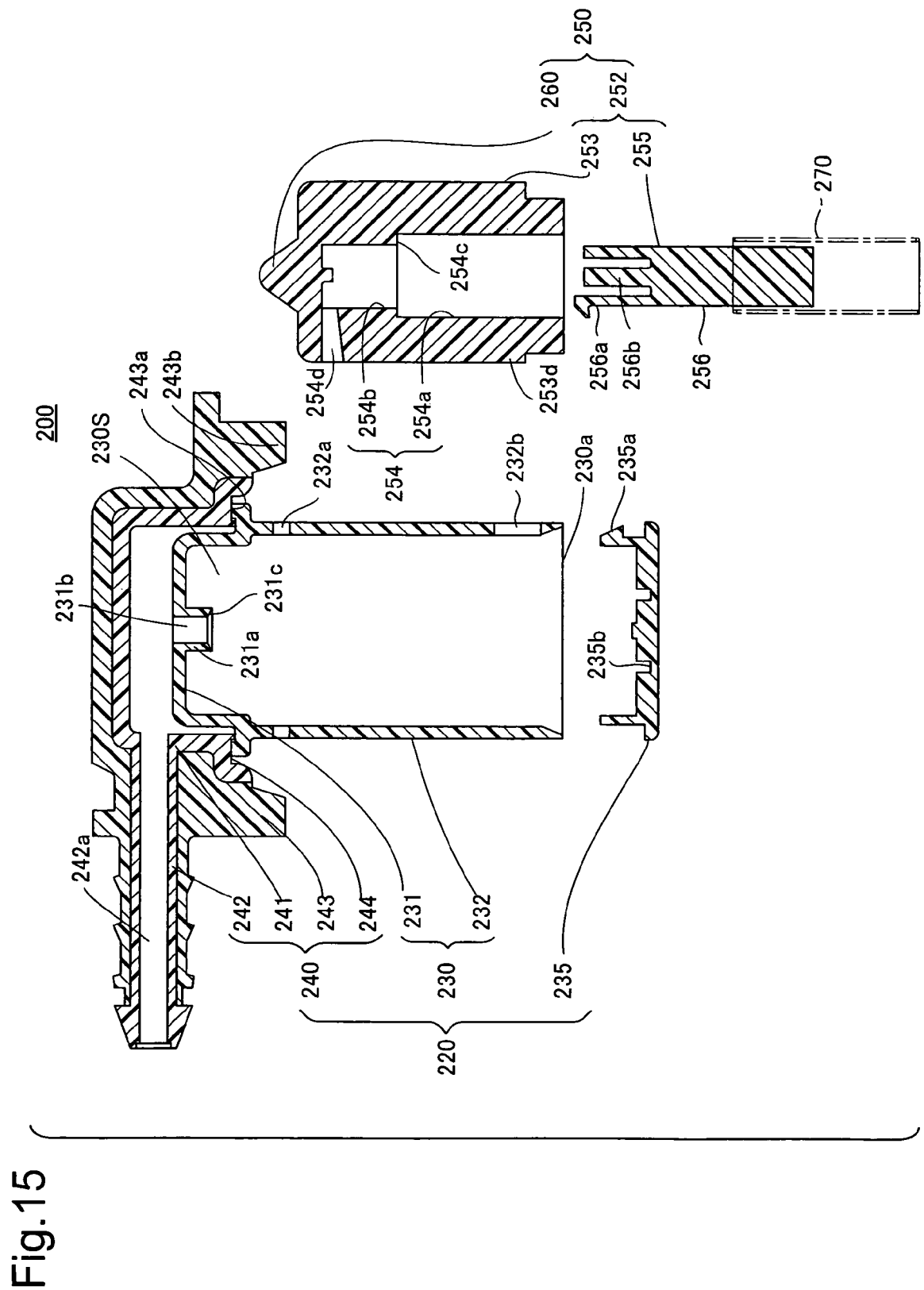
FIG. 15 is a cross-sectional view of the assembly of the fuel cutoff valve.

FIG. 15 is a cross-sectional view of the assembly of the fuel cutoff valve 200. The casing main body is cup-shaped, surrounded by a top wall 231 and a side wall 232, and the bottom thereof forms an opening 230a. A passage formation projection 231a, provided extending the downward direction, is formed in the center of the top wall 231, where a connection conduit 231d, connecting to the valve chamber 230S, is formed through the passage formation projection 231a. The valve chamber 230S side of the connection conduit 231b forms a first seal part 231c. A connection hole 232a, connecting the inside of the fuel tank FT to the valve chamber 230S, is formed in the side wall 232, and a fitting hole 232b for attaching the bottom plate 235 is formed in the side wall 232. The bottom plate 235 is a member that closes an opening 230a of the casing main body 230, where an engaging claw 235a that is formed on the outer peripheral part thereof mates with the fitting hole 232b of the casing main body 230 to attach so as to close the opening 230a of the casing main body 230. A spring support 235b for supporting the bottom end of the spring 270 is formed on the top surface of the bottom plate 235.

The cover 240 is provided with a cover main body 241, a tubular member 242, that extends towards the side from the center of the cover main body 241, and a flange 243 fabricated at the outer periphery of the cover main body 241, fabricated integratedly. A cover passage 242a is formed in the tubular member 242, where one end of the cover passage 242a is connected to the valve chamber 230S of the casing main body 230 through the connection conduit 231b, and the other end is connected to the canister side (not shown). An inside welding element 243a, welded to the top end of the casing main body 230, is formed under the cover main body 241. An outside welding element 243b, which is welded to the tank top wall FTa of the fuel tank FT, is formed at the bottom end part of the flange 243.

Figure 16:
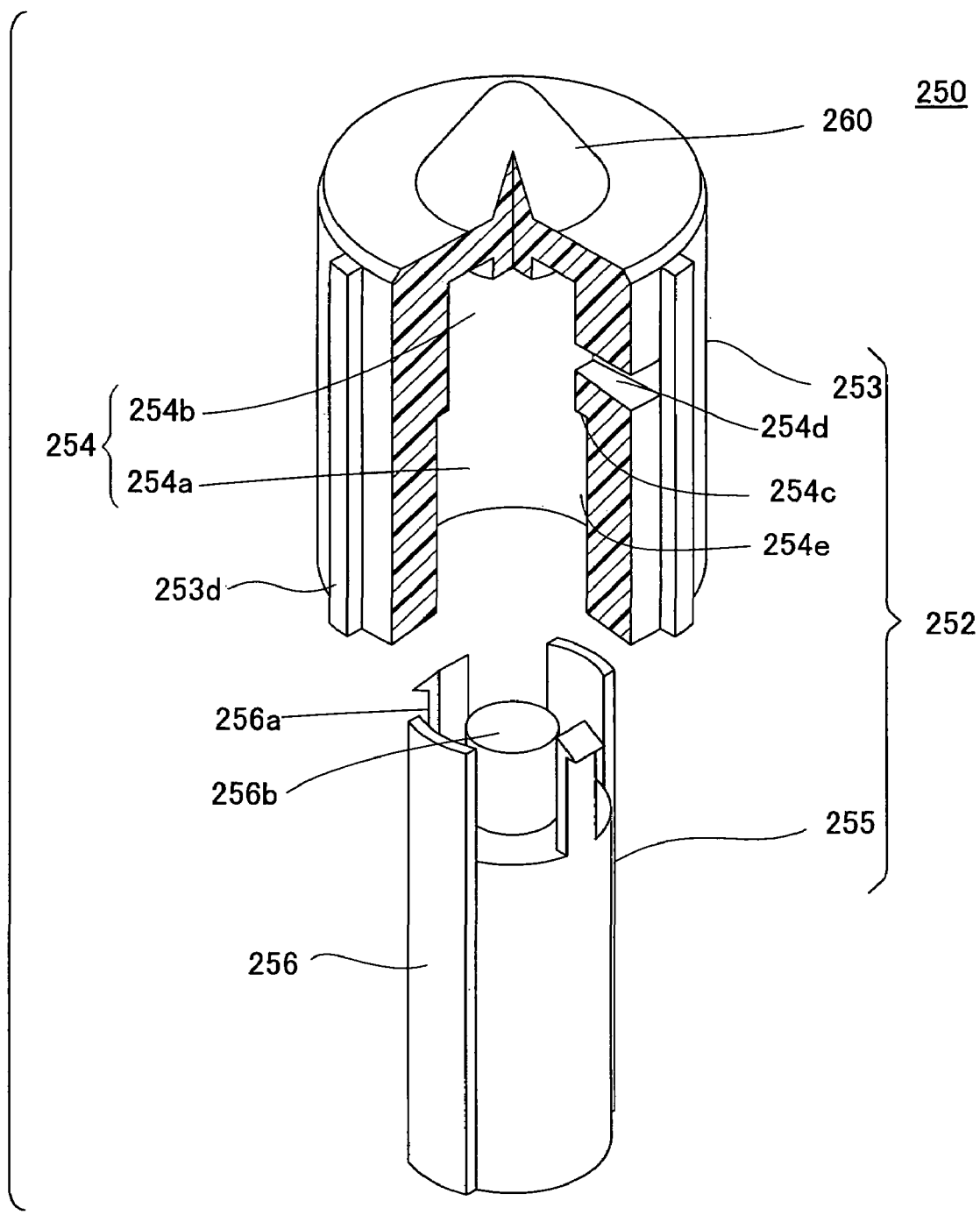
FIG. 16 is a partial cut away assembly perspective view of a float mechanism.

FIG. 16 is a partial cut away assembly perspective view of the float mechanism 250. In FIG. 15 and FIG. 16, the float mechanism 250 is provided with a float 252. A conical upper valve unit 260 is provided protruding at the top of the float 252. The float 252 is provided with a first float body 253 and a second float body 255, assembled together into a single unit. The first float body 253 is cup-shaped, having a storage chamber 254 that is open at the bottom. The storage chamber 254 has a bottom hole for housing the second float body 255, and is provided with a large diameter bore 254a and a small diameter bore 254b that is formed at the top of the large diameter bore 254a, with the interval between forming a screen support 254c made from a step part that spreads in the radial direction. The spring support 254c supports the top end of the spring 270. The spring 270 is stored in a spring storage space 254e that is formed in the outer peripheral part of the second float body 255, which is the outer peripheral outer peripheral part of the storage chamber 254. (See FIG. 14.) Moreover, the storage chamber 254 is connected to the outside of the first float body 253 through vents 254b formed in two locations in the radial direction of the first float body 253. Guide ribs 253d, for guiding the float 252 in the upwards and downwards directions are provided on the outer peripheral part of the first float body 253. The guide ribs 253d are provided protruding in the form of a rib in the vertical direction in foul locations that are equally spaced about the periphery of the side wall of the first float body 253.

The second float body 255 is provided with an essentially cylindrical float main body 256 that is inserted into the storage space 254, and an engaging claw 256a is formed on the top thereof. The engaging claw 256a mates with the openings of the vents 254d in the first float body 253 to attach the second float body 255 to the first float body 253. A step 256b is formed on the top surface of the second float body 255 to increase the accuracy of positioning by pushing against a portion of the top wall of the storage chamber 254.

(2) Operation of the Fuel Cutoff Valve 200

Figure 17:
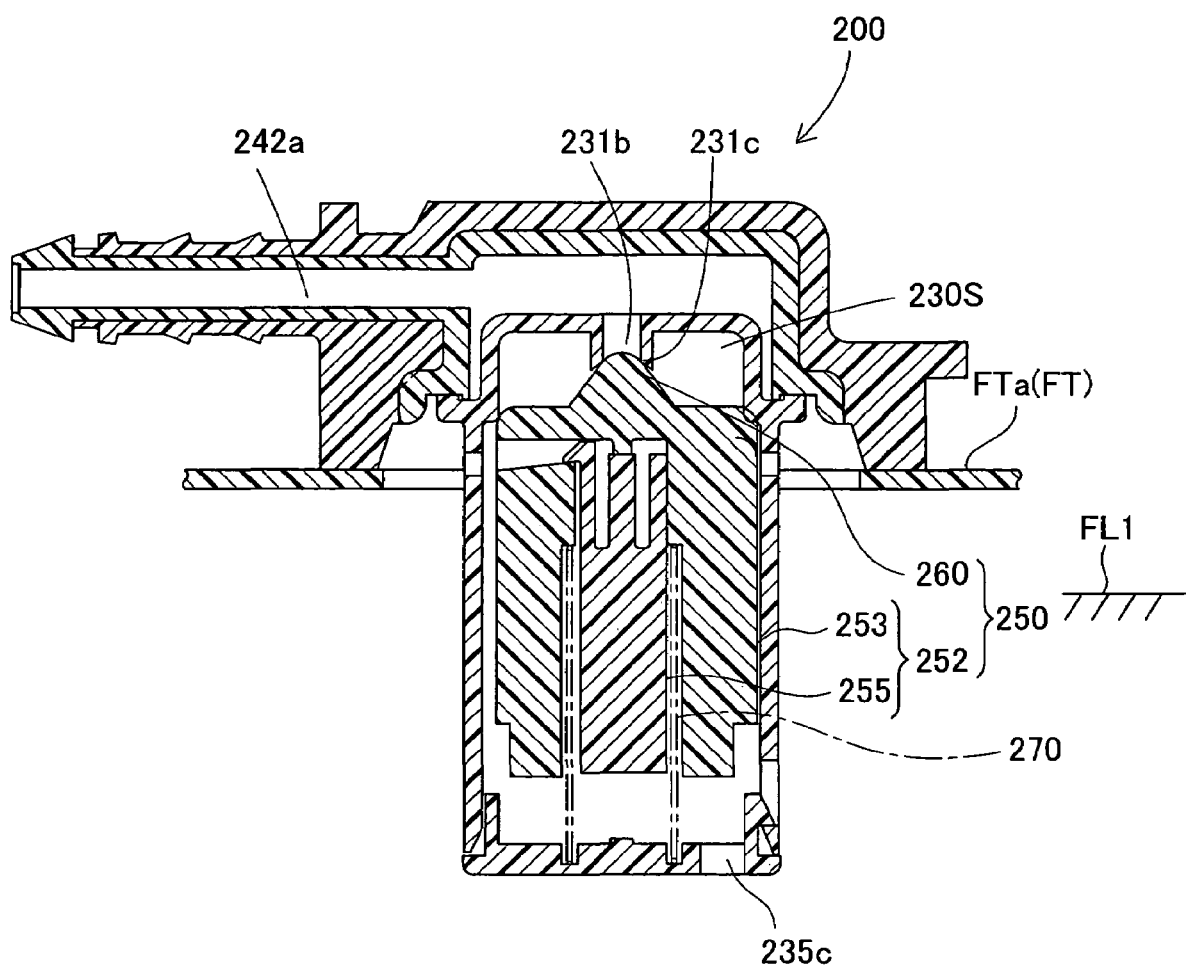
FIG. 17 shows the operation of the fuel cutoff valve.

The operation of the fuel cutoff valve 200 will be explained next. In FIG. 14, the fuel vapors that accumulate at the top of the fuel tank FT when the fuel level within the fuel tank FT rises because of the angle of the vehicle enter into the valve chamber 230S through the connection hole 232a and the connection hole 235c, and escape to the canister side from the valve chamber 230S through the connection conduit 231b and the cover passage 242a. As the fuel level within the fuel tank FT rises, the fuel enters into the valve chamber 230S through the connection hole 235c. As shown in FIG. 17, when the fuel level reaches a predetermined level FL1, the buoyant force of the float 252 and the force in the upwards direction due to the load on the spring 270 counteract the force in the downward direction due to the weight of the float 252, and when the former surpasses the latter, the float 252 rises. At this time, the upper valve unit 260 pushes against the first seal part 231c, closing the connection conduit 231b, this makes it possible to prevent the fuel from flowing out of the fuel tank FT while allowing the fuel vapors to escape from the fuel tank FT when the vehicle is, for example, at an angle.

Figure 18:
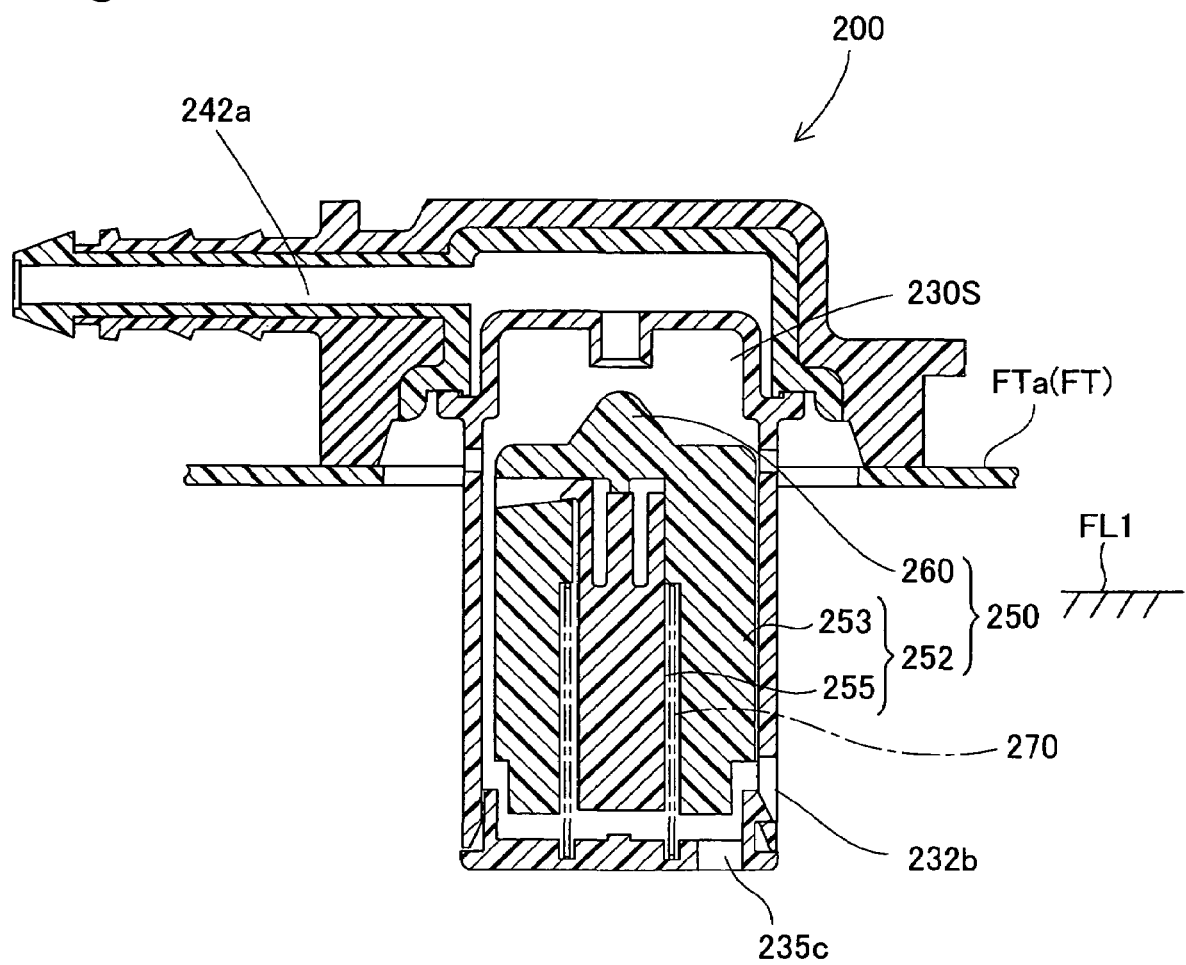
FIG. 18 shows the operation, continuing from FIG. 17.

On the other hand, when the fuel level in the fuel tank FT falls and the fuel within the valve chamber 230S drains from the connection hole 235c, etc., then, as shown in FIG. 18, the float 252 receives a force in the downward direction due to the decrease in the buoyancy, and the upper valve unit 260 separates from the first seal part 231c, opening the connection conduit 231d.

(3) Action and Effects of the Present Invention

Given the float 252, described above, there are the effect of improving the fabrication cycle and reducing variation in the buoyancy of the float because of the structure of the first float body 253 and the second float body 255, the same as in the first and second examples of embodiment.

Note that although the upper valve unit 260 was a conical shape equipped projecting at the top of the float 252, the upper valve unit 260 is not limited thereto, but rather may use the two-stage valve of the upper valve unit 160 in the second embodiment. (See FIG. 7.)

D. Fourth Embodiment

Figure 19:
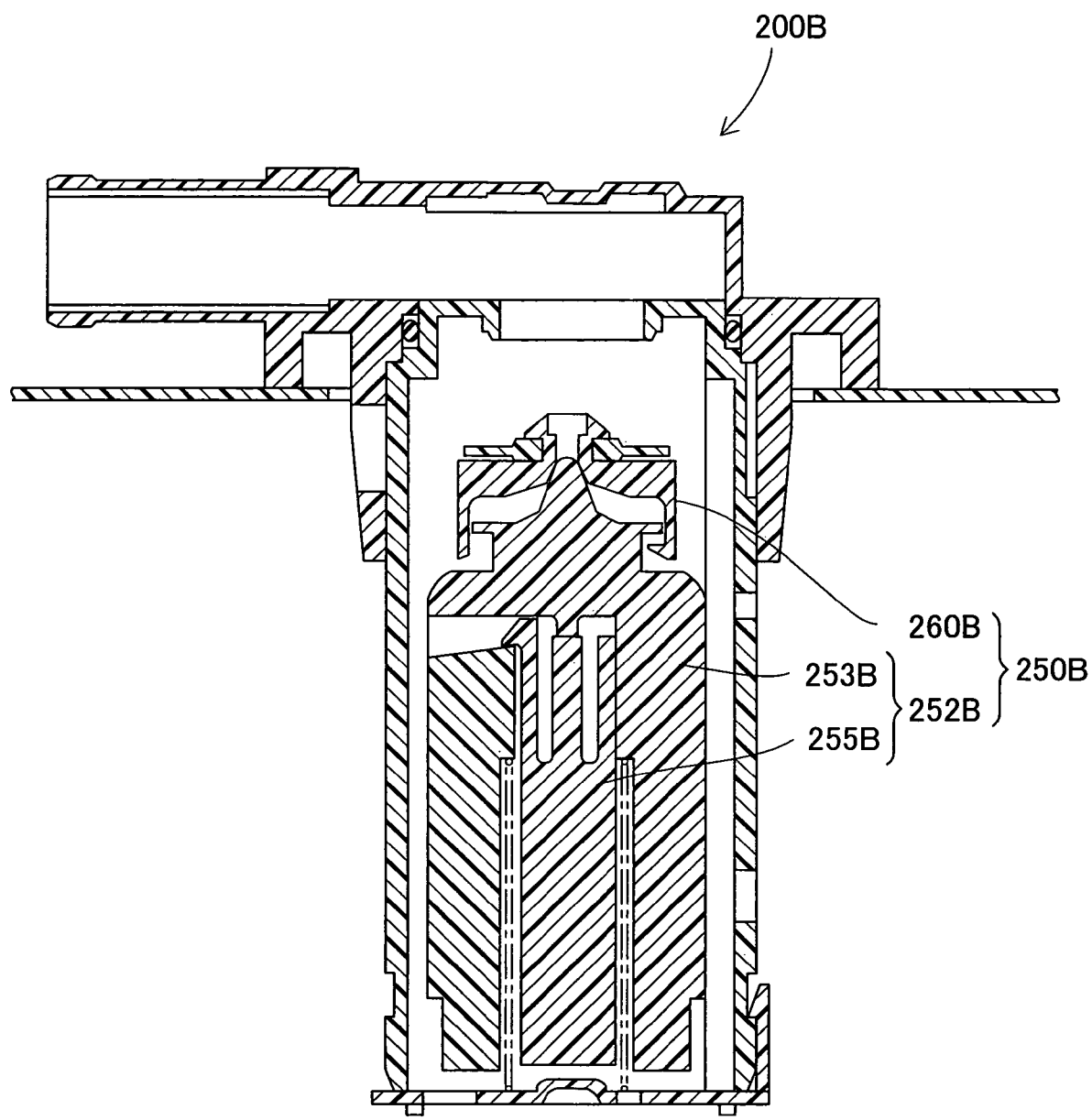
FIG. 19 is a cross-sectional view illustrating a fuel cutoff valve according to a fourth embodiment.

The fuel cutoff valve according to a fourth embodiment is a modified example of the fuel cutoff valve as set forth in the second embodiment, and instead of the float 152 in FIG. 7, the structure uses a float mechanism that uses the float 252 in FIG. 15. FIG. 19 is a cross-sectional view illustrating a fuel cutoff valve 200b. The float mechanism 250b of the fuel cutoff valve 200b is provided with a float 252b having a first float body 253b and a second float body 255b, and provided with an upper valve unit 260B that is attached to the top of the float 252b. The present embodiment has the same actions and effects as in the second embodiment, described above. In this way, the float and the upper valve unit can be structured in a variety of ways insofar as they have these actions and effects.

Note that the present invention is not limited by the example of embodiment described above, but rather may be embodied in a variety of forms without deviating from the substance thereof, and may, for example, be modified as follows. While in the examples of embodiment described above, the fuel cutoff valve was described as a structure that was attached to the upper wall of a tank so as to block the attachment holes, the fuel cutoff valve is not limited thereto, but may be structured so as to attach to the top part within the fuel tank in the so-called in-tank method.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A cut off valve that opens and closes a connection conduit for connecting a fuel tank to a location exterior to the fuel tank, the cut off valve comprising:
    a casing that includes a valve chamber that is constructed and arranged to connect the fuel tank to the connection conduit;
    a float mechanism that is accommodated in the valve chamber to open and close the connection conduit according to a level of a liquid fuel in the fuel tank; and
    a spring that presses the float mechanism in a closing direction,
    wherein the float mechanism includes
    (i) a first float body that has a valve portion, which opens and closes the connection conduit, a storage chamber, which is opened downwardly, a spring support, which supports an end of the spring, and a vent, which is formed through an upper portion of the first float body, wherein the vent connects the storage chamber with an outside space of the float mechanism; and
    (ii) a second float body that is received in the storage chamber to be joined with the first float body, wherein the second float body includes an engaging claw that engages with the vent and joins the first float body and the second float body,
    wherein the float mechanism includes a spring storage space for receiving the spring, and
    wherein the spring storage space is formed between an inner wall of the storage chamber and an outer circumference of the second float body and is connected with the vent.

2. The fuel cut off valve in accordance with claim 1, wherein the first float body comprises a substantially columnar first float main body and an upper valve unit disposed on an upper portion of the first float main body, the valve portion being the upper valve unit.

* * * * *